United States Patent
Murray

(10) Patent No.: US 7,912,997 B1
(45) Date of Patent: Mar. 22, 2011

(54) DIRECT MEMORY ACCESS ENGINE

(75) Inventor: James J. Murray, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 358 days.

(21) Appl. No.: 12/057,331

(22) Filed: Mar. 27, 2008

(51) Int. Cl.
*G06F 13/28* (2006.01)

(52) U.S. Cl. .......................... 710/22; 713/400

(58) Field of Classification Search ........ 710/22
See application file for complete search history.

(56) References Cited

U.S. PATENT DOCUMENTS

| | | | |
|---|---|---|---|
| 6,128,678 A * | 10/2000 | Masteller | 710/52 |
| 7,251,702 B2 * | 7/2007 | Lee et al. | 710/240 |
| 7,310,396 B1 * | 12/2007 | Sabih | 375/354 |
| 7,343,442 B2 * | 3/2008 | Rankin et al. | 710/317 |
| 2002/0062408 A1 * | 5/2002 | Jahnke et al. | 710/22 |
| 2005/0210163 A1 * | 9/2005 | Suzuki et al. | 710/22 |
| 2006/0168359 A1 * | 7/2006 | Bissessur et al. | 710/8 |
| 2008/0162663 A1 * | 7/2008 | Schlansker et al. | 709/217 |
| 2009/0323728 A1 * | 12/2009 | Koutsoures et al. | 370/503 |

OTHER PUBLICATIONS

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.
UG200 (v1.0) "Embedded Processor Block in Virtex-5 FPGAs", Jan. 15, 2008, 323 pages, Xilinx, Inc. 2100 Logic Drive, San Jose, CA 95124.
UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

*Primary Examiner* — Henry W Tsai
*Assistant Examiner* — Elias Mamo
(74) *Attorney, Agent, or Firm* — W. Eric Webostad; Kevin T. Cuenot

(57) ABSTRACT

A direct memory access engine is described. The direct memory access engine has a transmit channel coupled to a transmit interface, a receive channel coupled to a receive interface, an arbiter coupled to both the transmit channel and the receive channel, and a set of queues coupled to the arbiter. The set of queues has command buffers, transmit buffers, and receive buffers. A direct memory access-to-processor bus interface is coupled to the set of queues. The transmit buffers are for first separate read and write requests. The receive buffers are for second separate read and write requests which are independent of the first separate read and write requests.

19 Claims, 6 Drawing Sheets

| WORD# 871 | BYTE OFFSET 872 | DESCRIPTOR FIELD 873 | |
|---|---|---|---|
| 0 | | NEXT DESCRIPTOR POINTER | |
| 1 | | BUFFER ADDRESS | |
| 2 | | BUFFER LENGTH | |
| 3 | | STATUS/ CONTROL | APPLICATION-DEFINED DATA |
| 4 | | APPLICATION-DEFINED DATA | |
| 5 | | APPLICATION-DEFINED DATA | |
| 6 | | APPLICATION-DEFINED DATA | |
| 7 | | APPLICATION-DEFINED DATA | |

FIG. 6

DIRECT MEMORY ACCESS ENGINE

FIELD OF THE INVENTION

The invention relates to integrated circuit devices ("ICs"). More particularly, one or more aspects generally relate to a direct memory access engine for a processor block Application Specific Integrated Circuit ("ASIC") core.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters designed into the embedded processors, such as latency, transistor gate delay, data throughput, and the like, may be assumed to be present in the environment to which the embedded processors are to be coupled. Thus, even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as in the past, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. By hardening a circuit instantiated in FPGA fabric, it is generally meant replacing or bypassing configuration memory cells with hardwired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging than those associated with FPGAs, and thus yield for such ASICs may be relatively low as compared to yield of FPGAs. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design.

SUMMARY OF THE INVENTION

Accordingly, it would be desirable and useful to enhance performance of FPGAs without a significant loss of design flexibility associated with adding an ASIC core.

One or more aspects generally relate to a direct memory access engine for a processor block Application Specific Integrated Circuit ("ASIC") core.

An aspect relates generally to a direct memory access engine. The direct memory access engine has a transmit channel coupled to a transmit interface, a receive channel coupled to a receive interface, an arbiter coupled to both the transmit channel and the receive channel, and a set of queues coupled to the arbiter. The set of queues has command buffers, transmit buffers, and receive buffers. A direct memory access-to-processor bus interface is coupled to the set of queues. The transmit buffers are for first separate read and write requests. The receive buffers are for second separate read and write requests which are independent of the first separate read and write requests.

Another aspect relates generally to a system for direct memory access. A memory controller interface is coupled on one side of a crossbar switch, and a direct memory access engine is coupled on another side of the crossbar switch for communication with the memory controller interface via the crossbar switch; The direct memory access engine has a transmit channel coupled to a transmit interface, a receive channel coupled to a receive interface, an arbiter coupled to both the transmit channel and the receive channel, and a set of queues coupled to the arbiter. The set of queues has command buffers, transmit buffers, and receive buffers. A direct memory access-to-processor bus interface is coupled to the set of queues. The transmit buffers are for first separate read and write requests. The receive buffers are for second separate read and write requests which are independent of the first separate read and write requests.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 6 is a table diagram depicting an exemplary embodiment of a descriptor format.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
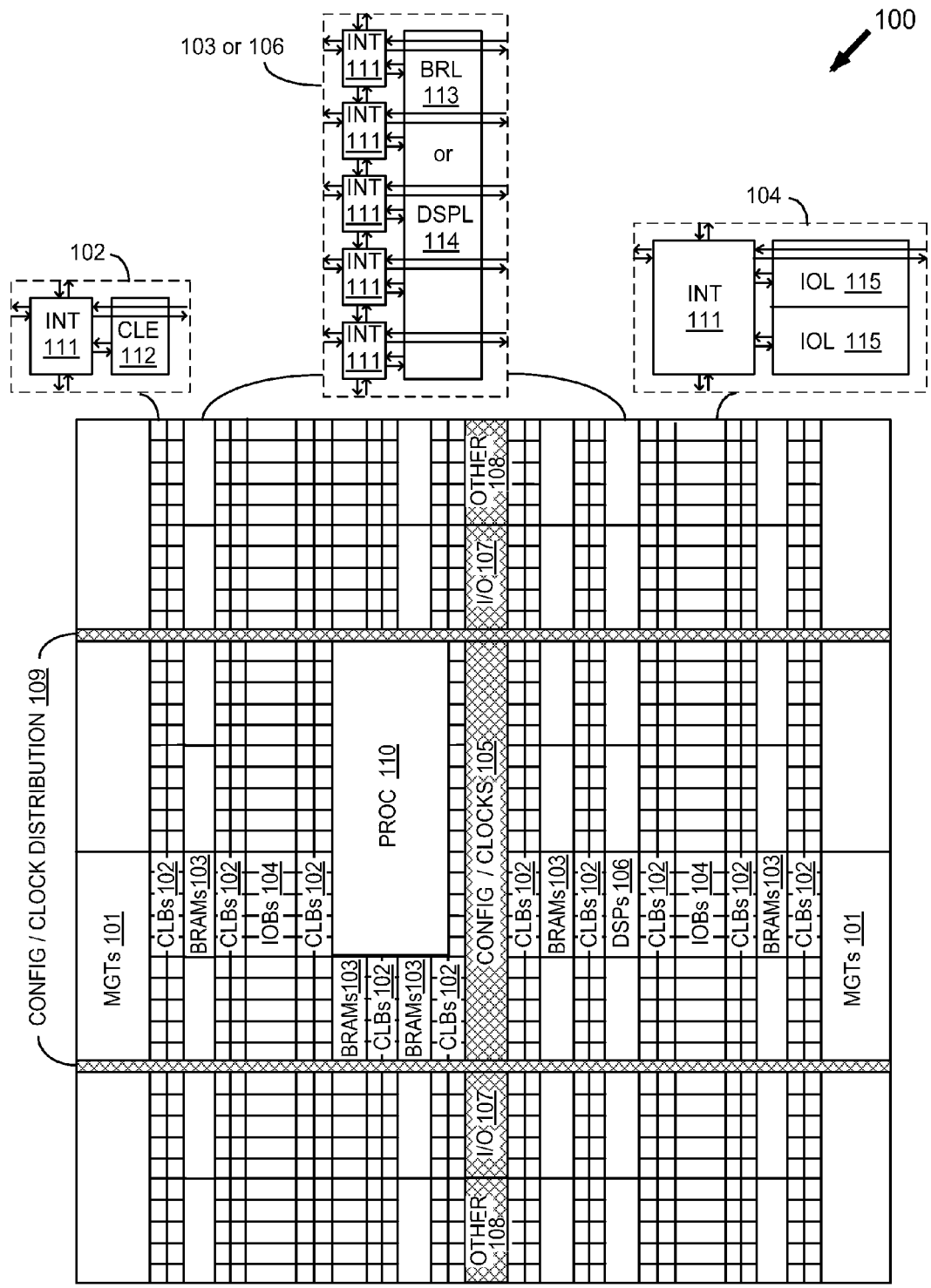
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5™ FPGA available from Xilinx, Inc. of San Jose, Calif., can be programmed to incorporate pre-developed logic blocks with pre-designed functionalities, i.e., "soft cores." A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers are not programmable logic.

Moreover, a hardwired core, such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings.

Figure 2:
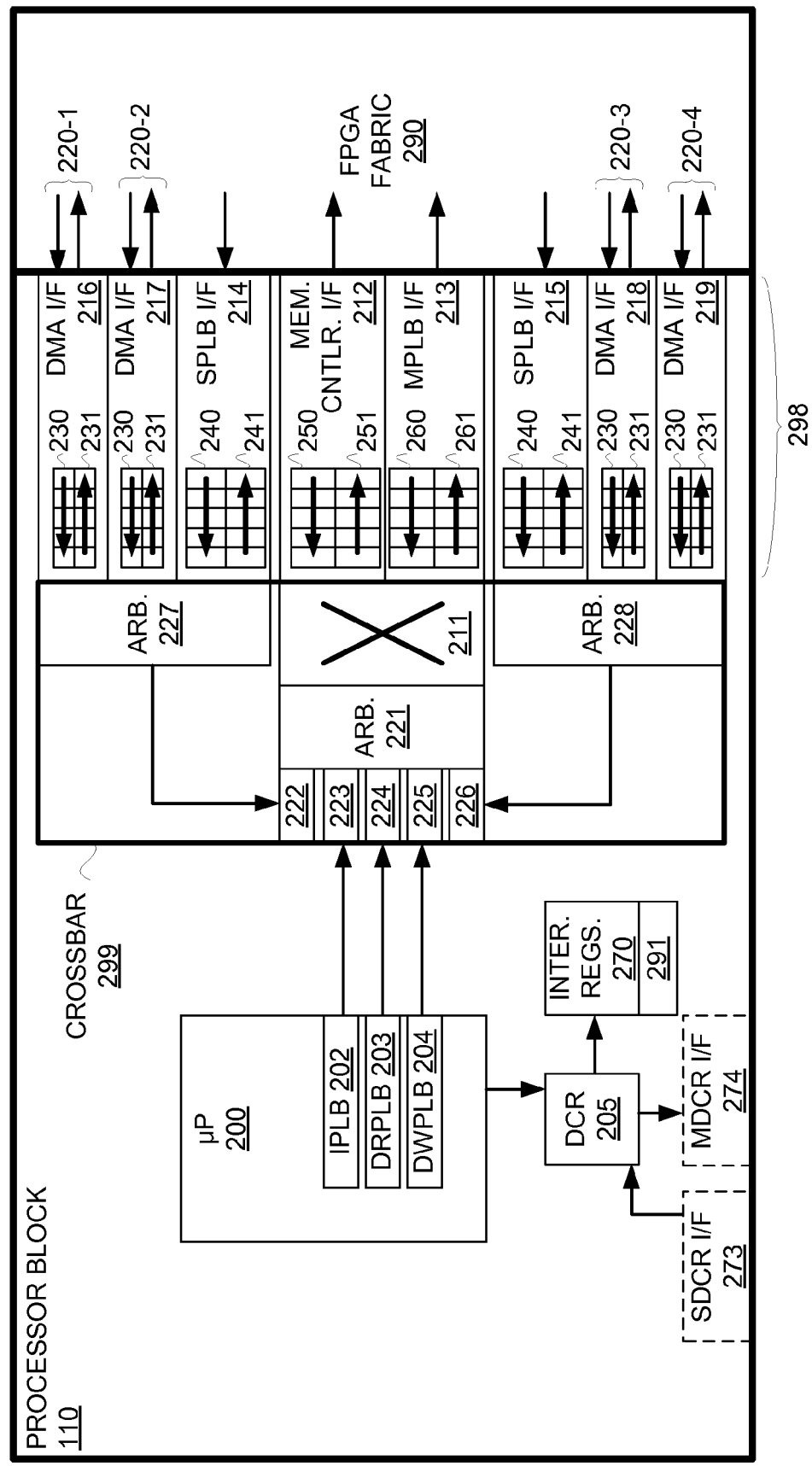
FIG. 2 is a block diagram depicting an exemplary embodiment of an Application Specific Integrated Circuit ("ASIC") processor block core.

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1 in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 is a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290, to which processor block 110 is coupled. Processor block 110 includes registers, such as internal registers 270, which may be set in order to condition processor block 110 for any of a variety of user selectable configurations, as described below in additional detail.

A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

DCR block 205 may be coupled to an optional slave DCR interface ("SDCR interface") 273 and an optional master DCR interface ("MDCR interface") 274. Thus, a user, a circuit design instantiated in FPGA 290, a microprocessor 200, or some other entity may provide register input to internal registers 270 via SDCR interface 273 subject to control of DCR 205. Alternatively, register input may be provided to SDCR interface 273 under control of DCR 205 for registers (not shown for purposes of clarity) external to processor block 110 coupled via MDCR interface 274. Such external registers may be instantiated in FPGA fabric 290.

Arrows in FIG. 2 indicate the direction of a transaction. Thus, for example, register input provided to DCR 205 may be from a transaction initiated by microprocessor 200 or from a master device (not shown for purposes of clarity) coupled to SDCR interface 273. Such transaction may pass through DCR 205 to MDCR interface 274 or to internal registers 270. One or more master devices, other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges. There is a subtle difference between SPLB interfaces 214 and 215 and DMA interfaces 216 through 219. For SPLB interfaces 214 and 215, transactions are initiated externally to processor block 110, such as in FPGA fabric 290. However, for DMA transactions, DMA receive transactions may be initiated in FPGA fabric 290 and DMA transmit transactions may be initiated in a DMA engine, such as DMA interfaces 216 through 219. DMA interfaces 216 and 219 may be coupled to FPGA fabric by local links 220-1 through 220-4, respectively, as described below in additional detail. DMA interfaces 216 through 219, SPLB interfaces 214 and 215, memory controller interface 212 and MPLB interface 213 are collectively referred to herein as "interfaces 298."

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. One or more of SPLB interfaces 214 and 215 are part of processor block 110, and one or more of DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211 responsive to a decoded address provides such address for example to memory controller interface 212 to access a memory controller device coupled thereto or to MPLB interface 213 to access a peripheral device coupled thereto.

Memory controller interface 212 includes an inbound first-in, first-out buffer ("FIFO") 250 and an outbound FIFO 251. MPLB interface 213 includes an inbound FIFO 260 and an outbound FIFO 261. Each SPLB interface 214 and 215 respectively includes an inbound FIFO 240 and an outbound FIFO 241. Lastly, each DMA interface 216 through 219 respectively includes an inbound FIFO 230 and an outbound FIFO 231. Thus, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

Order of transactions is preserved via pipelines and buffers, including a command buffer (not shown for purposes of clarity) for multiple transactions targeted to memory controller interface 212 for example. Likewise, order of transactions is preserved via pipelines and buffers, including another command buffer (not shown for purposes of clarity) for multiple transactions targeted to MPLB interface 213 for example. The side of MPLB interface 213 associated with FPGA fabric 290 is not a FIFO-based protocol, but rather is an address/data transaction protocol with a data phase and an address phase.

In addition to memory controller interface 212, which is configurable for a user-specified memory protocol, and MPLB interface 213, which uses a PLB protocol with bidirectional read and write busing, there are additional blocks that increase the interface bandwidth of processor block 110. These additional blocks may include one or more of DMA interfaces 216 through 219 and include one or more of SPLB interfaces 214 and 215. Again, each of DMA interfaces 216 through 219 includes an inbound FIFO 230 and an outbound FIFO 231, and each of SPLB interfaces 214 and 215 includes an inbound FIFO 240 and an outbound FIFO 241.

In this exemplary embodiment, DMA interfaces 216 and 217 and SPLB interface 214 are grouped together for access to decoder 222 via arbiter 227. Likewise, DMA interfaces 218 and 219 and SPLB interface 215 are grouped together for access to decoder 222 via arbiter 228. It should be appreciated that DMA protocols and PLB protocols may be used for coupling to any of a variety of peripheral devices. In this exemplary embodiment, DMA interfaces 216 through 219 are coupled to local links 220-1 through 220-4, respectively. Each local link is a parallel but unidirectional communication bus. In other words, in this exemplary embodiment there are four output local links and four input local links. Input local links may be associated with FIFOs 230 and output local links may be associated with FIFOs 231. Transmit local links are independent of their associated receive local links. Local links are well known, and thus not described in unnecessary detail herein.

In the exemplary embodiment, clock rate of SPLB interfaces 214 and 215 is user settable to an integer ratio with respect to the frequencies of operation of microprocessor 200 and crossbar 299. However, the data rate of communication via local links 220-1 through 220-4 is independent of the clock rate of microprocessor 200 and may be independent of one another. DMA interfaces 216 through 219 may be asynchronous with respect to crossbar 299; in other words, no edge relationship need be present. Furthermore, DMA interfaces 216 through 219 may be asynchronous with respect to one another. The side of FIFOs 240, 241, 250, 251, 260, and 261 associated with FPGA fabric 290 generally has a synchronous relationship with respect to crossbar 299, and the side of FIFOs 230 and 231 associated with FPGA fabric 290 generally has an asynchronous relationship with respect to crossbar 299. For purposes of clarity by way of example and not limitation, it shall be assumed that the speed of operation of DMA interfaces 216 through 219 is approximately 200 to 250 MHz, and that the speed of operation of SPLB interfaces 214 and 215 is approximately 133.3 to 183.3 MHz.

In the exemplary embodiment of processor block 110, crossbar 299 is a five-to-two crossbar. In other words, there are five ports, respectively associated with decoders 222 through 226, for coupling to two blocks, respectively memory controller interface 212 and MPLB interface 213. Alternatively, a nine-to-two crossbar may be used or some other crossbar configuration; however, for reasons of anticipated utilization and relative clock rates, a five-to-two crossbar 299 is illustratively shown.

FIFOs of interfaces 298 of processor block 110, in addition to facilitating adaptation to differences in bandwidth, facilitate processing transactions concurrently by pipelining such transactions. As described below in additional detail, switch 211 is a non-blocking crossbar switch, and once access is granted to switch 211 execution happens immediately. Furthermore, because memory controller interface 212 is capable of operating at the rated frequency of microprocessor 200, having communication with processor block 110 via one or more of DMA interfaces 216 through 219 or one or more of SPLB interfaces 214 and 215, or a combination thereof, is facilitated by having performance level of memory controller interface 212 enhanced in comparison with that of other interface blocks of processor block 110, namely SPLB interfaces 214 and 215 and DMA interfaces 216 through 219. Moreover, performance level of memory controller interface 212 is substantially greater than circuits instantiated in CLBs or other programmable logic of FPGA fabric 290.

A master device, for example instantiated in FPGA fabric 290 or another ASIC core of FPGA 100, may be coupled to processor block 110 via an SPLB interface of SPLB interfaces 214 or 215 or a DMA interface of DMA interfaces 216 through 219. Memory controller interface 212 may be thought of as having only one slave device coupled to it, namely memory coupled to it via a memory controller. Furthermore, such a memory controller for interfacing to memory may be substantially simplified, as the physical ("PHY") layer of such memory controller may be directly interfaced with memory controller interface 212. MPLB interface block 213, however, is not limited to a single slave device, but may have multiple slave devices coupled to it. This is part of the reason for the slower frequency of operation of MPLB interface 213 in comparison to that of memory controller interface 212.

Other master devices, such as other processors or circuits whether instantiated in FPGA fabric 290 or as ASIC cores, may be coupled to processor block 110 via any of DMAs 216 through 219 or SPLB interfaces 214 or 215. It is not necessary that all transactions proceed to memory via memory controller interface 212. Thus, a master device may be coupled for example to DMA interface 216 for executing a transaction utilizing a slave device, which may be a memory controller or a peripheral device, coupled to MPLB interface 213. Moreover, a master device coupled to SPLB interface 215 may issue a transaction for a slave device coupled to MPLB interface 213. It should, however, be understood that excluding transactions initiated by microprocessor 200, transactions from master devices coupled to any of DMA interfaces 216 through 219 or any of SPLB interfaces 214 and 215 go into crossbar 299 and then via either memory controller interface 212 or MPLB interface 213 to a memory controller or to one or more other slave devices, respectively, coupled thereto. Moreover, transactions may go from FPGA fabric 290 to memory controller interface 212 or MPBL interface 213 and then to any of local links 220-1 through 220-4 via DMA interfaces 216 through 219, respectively. In short, transactions go into and out of crossbar 299 and interfaces 298 of processor block 110, and thus crossbar 299 and interfaces 298 in combination may be thought of as a bridge or bridges.

Microprocessor 200 is a master device as it issues transactions for other devices. Furthermore, it should be appreciated that any transactions which originate via a master device, including microprocessor 200 or an external master device coupled to any of DMA interfaces 216 through 219 or SPLB interfaces 214 and 215, exit processor block 110.

SPLB interfaces 214 and 215, like MPLB interface 213, are 128 bits wide and may be set to operate as 32- or 64-bit wide interfaces. In contrast, DMA interfaces 216 through 219 to FPGA fabric 290 are each 32 bits wide. Moreover, MPLB interface 213 and SPLB interfaces 214 and 215 are dynamic interfaces, as their bus width on a side associated with FPGA fabric 290 may be varied for coupling to a soft bus configured using PIPs of FPGA fabric 290; however, even though DMA interfaces 216 through 219 may be coupled to a soft bus configured using PIPs of FPGA fabric 290, their bus width is fixed at 32 bits.

FPGA fabric 290 may operate much more slowly, for example, than crossbar 299. Thus, a five-to-two crossbar, rather than a nine-to-two crossbar, may be implemented, where all of DMA interfaces 216 through 219 are operating at full capacity without any apparent "dead cycle" or "bubble." Part of this implementation involves having interface blocks, such as DMA interfaces 216 through 219 and SPLB interfaces 214 and 215, accumulate a threshold amount of data before being granted access to switch 211. Local links 220-1 through 220-4 are dedicated interfaces, not soft buses, and there is no notion of address mapping for local links 220-1 through 220-4. There is flow control signaling for local links, such as ready/not ready signaling.

DMA interfaces 216 through 219 and SPLB interfaces 214 and 215 are "slave" interfaces. More particularly, DMA interfaces 216 through 219 are controlled via a DCR interface, described below in additional detail, for servicing microprocessor 200 or another master device coupled via such a DCR interface. SPLB interfaces 214 and 215 have coupled to them a master device, which is external to processor block 110, such as may be instantiated in FPGA fabric 290. Memory controller interface 212 and MPLB interface 213 are "slave" interfaces with respect to microprocessor 200, DMA interfaces 216 through 219, and SPLB interfaces 214 and 215, as memory controller interface 212 and MPLB interface 213 each service microprocessor 200, and one or more master devices coupled via DMA interfaces 216 through 219 or SPLB interfaces 214 and 215. Memory controller interface 212 and MPLB interface 213 are master interfaces with respect to "slave" devices coupled thereto via buses external to processor block 110.

DMA interfaces 216 through 219 are scatter-gather DMA interfaces. In other words, DMA interfaces 216 through 219 search for descriptor information in memory. This search may involve proceeding down a chain of descriptors, where such descriptors include a starting address and a length. Once a target descriptor is identified, the information at the descriptor in memory is read and provided to the requesting master device. Alternatively, a write to a starting address for a specified length in memory may be done using DMA interfaces 216 through 219. Once one descriptor is processed, another descriptor may automatically be processed, and so on, as this is peripheral-to-memory communication.

Arbiters 227 and 228 may be implemented as round robin arbiters. Thus, for example, arbiter 227 may select any of DMA interface 216, DMA interface 217, or SPLB interface 214 in a round robin format. For SPLB interfaces 214 and 215 or DMA interfaces 216 through 219 to have a right to request access to switch 211, such interfaces have stored therein a set threshold amount of data for a write or have a set threshold amount of space for a read ready to be exchanged across switch 211. For SPLB interfaces 214 and 215, the threshold level of data or space may be set by a user. For DMA interfaces 216 through 219, this threshold level of data or space is not user settable, but rather is fixed by DMA protocol.

It should be appreciated that FIFOs 230, 231, 240, 241, 250, 251, 260, and 261 each have a bit width corresponding to the bit width of memory controller interface 212 and MPLB interface 213, namely 128 bits wide for example. Thus, the input and output FIFOs of DMA interfaces 216 through 219 may receive 32 bits at a time with byte enables on a 128-bit wide bus of associated FIFOs 230 and 231. In other words, a user may write, or read, multiple quadwords onto, or from, a line of any of FIFOs 230, 231, 240, 241, 250, 251, 260, and

261. FIFOs 230, 231, 240, 241, 250, 251, 260, and 261 may be implemented with latches or flip-flops or a combination thereof. Again, the user may set the threshold amount of data for SPLB interfaces 214 and 215 to request access to switch 211. The minimum a user may set may be one quadword. However, once access is obtained, even if there is a partial quadword to process as part of such data meeting or exceeding a threshold amount, such partial quadword is processed along with the data for which access is granted.

Inbound FIFOs 230, 240, 250, and 260 allow data to be accumulated. Once a threshold amount of data for requesting access to crossbar 299 is accumulated in any of FIFOs 230, 240, 250, and 260, then a request may be made to an arbitration stage for access to crossbar switch 211. The threshold amount of data to be accumulated by SPLBs 214 and 215 may be individually set by register settings. Thus each of SPLBs 214 and 215 may have same, different, or a combination of one or more threshold settings. Such threshold settings include 1, 4, 8, or 16 quadwords. Each cache word may be 2 quadwords wide. To reduce request overhead to access switch 211, arbiters 227 and 228 preclude requests until a threshold amount of data has been accumulated in an inbound FIFO. Thus, this is a load balancing-multiplexing protocol. Data flow out of outbound FIFOs 231, 241, 251, and 261 may be dependent upon master devices external to processor block 110, such as may be instantiated in FPGA fabric 290.

As described below in additional detail, register address mapping is configurable for processor block 110, namely for accessing either memory controller interface 212 or MPLB interface 213. Addresses are input to decoders 222 through 226. More particularly, after arbitration via arbiter 227 or 228, an address associated with a transaction to be provided to either memory controller interface 212 or MPLB interface 213 is decoded by decoder 222 or 226, respectively. It should be appreciated that address decoding may be performed before arbitration by arbiter 221; in other words, address decoding is performed by decoders 222 through 226 before crossbar arbitration by arbiter 221. Additionally, as part of the decoding to select between memory controller interface 212 or MPLB interface 213, there may be additional decoding of an address within the selected interface, namely an address for a slave device coupled to memory controller interface 212 or MPLB interface 213. A decoded address may be provided to arbiter 221 for providing access to switch 211. Arbiter 221 may be configured by user selection for any of a variety of arbitration protocols responsive to register input. Examples of such arbitration protocols include round robin, fixed, and least recently used; however, other arbitration protocols may be used. Arbitration by arbiter 221 and decoding by decoders 222 through 226 may be performed with some degree of parallelism to facilitate a one clock cycle latency as previously described.

Crossbar 299 provides a non-blocking interconnection. By "non-blocking", it means that two different master devices may access two different slave devices simultaneously. For example, a master device in FPGA fabric via one of DMA interfaces 216 through 219 may access memory controller interface 212 while microprocessor 200 simultaneously accesses MPLB interface 213. However, multiple master devices may have multiple transactions that are pipelined to a single interface, such as either or both of interfaces 212 and 213.

Supported transfer types may include single word, cache line, fixed length burst, and intermediate burst (e.g., end location of bursting transfer not presently known). It should be appreciated that there is a distinction between burst and line data transfers. Line transfers have an architectural identity in that they start at the beginning of a line and go to the end of the line. Thus, for a cache line transfer, access starts from the beginning of the line and goes to the end of the line, whether or not a wraparound condition follows. In contrast, burst transfers may start at the beginning of any word on a line at an identified address and continue until an end word is reached. Thus, a burst transfer may, but need not, start at the beginning of a line. Because of the architectural identity of line transfers, line transfers are not translated. However, burst transfers may be translated. Thus, for example, long bursts may be translated to fixed short-length bursts by command translation circuitry in SPLB interfaces 214 and 215.

SDCR interface 273 is a slave DCR interface that allows the coupling thereto of one or more master devices external to processor block 110. Therefore, transactions generated by external master devices may come through SDCR interface 273 into crossbar 299. On the other hand, MDCR interface 274 is capable of passing generated transactions to one or more soft DCR slave devices, described below in additional detail.

The ability to couple other microprocessors to processor block 110 facilitates use of processor block 110 in a multiprocessor system. For example, via SDCR interface 273 and DCR 205, another embedded processor in FPGA 100 or a soft processor instantiated in FPGA fabric 290 may be a master device that uses crossbar 299 and one or more of interfaces 212 and 213, with or without microprocessor 200 being involved. Additionally, default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

Each local link 220-1 through 220-4 has a separate receive bus and transmit bus, each of which is 32 bits wide and each of which is independent from one another. Quadwords may be aligned as previously described for providing 128 bits to inbound FIFOs 230. A local link, such as of local links 220-1 through 220-4, is either "all on" or "all off", and thus a scatter or gather approach is employed.

Hard or soft master devices configured for DMA access may be coupled to DMA interfaces 216 through 219 dedicated local links 220-1 through 220-4, respectively. However, soft buses conforming to DMA protocol may be used rather than dedicated buses. Thus, for example, a hard or soft master device may be coupled to a local link which is coupled to a DMA interface of DMA interfaces 216 through 219 of processor block 110. An example of such a DMA soft or hard master device includes an Ethernet Media Access Controller ("EMAC"), or a Peripheral Component Interconnect ("PCI") or PCI Express ("PCIe") device, among other DMA capable devices.

Within processor block 110 may be DMA interfaces 216 through 219 as previously described. For purposes of clarity by way of example and not limitation, it shall be assumed that each of these DMA interfaces is a 32-bit local link DMA engine capable of full-duplex communication. DMA interfaces or engines 216 through 219 are independent of one another, and thus there are four independent, full-duplex, 32-bit local link ports, as previously described with reference to local links 220-1 through 220-4. Again, for purposes of clarity by way of example and not limitation, it shall be assumed that a DMA channel refers to a single-direction interface, either a receive ("RX") or transmit ("TX") direction, between a 128-bit switch 211 and 32-bit local link ports 220-1 through 220-4. Moreover, for purposes of clarity and not limitation, it shall be assumed that a "DMA engine" refers to a full-duplex pair of DMA channels, namely one 32-bit channel for the RX direction and one 32-bit channel for the TX direction. Examples of uses of DMA engines 216 through 219 may include movement of data to and from an EMAC and movement of data to and from system memory. However, other known uses for DMA functionality may be supported via one or more of DMA engines 216 through 219. For purposes of clarity and not limitation, a single DMA engine 216 is described hereinafter, as such description equally applies to DMA engines 217 through 219.

Figure 3:
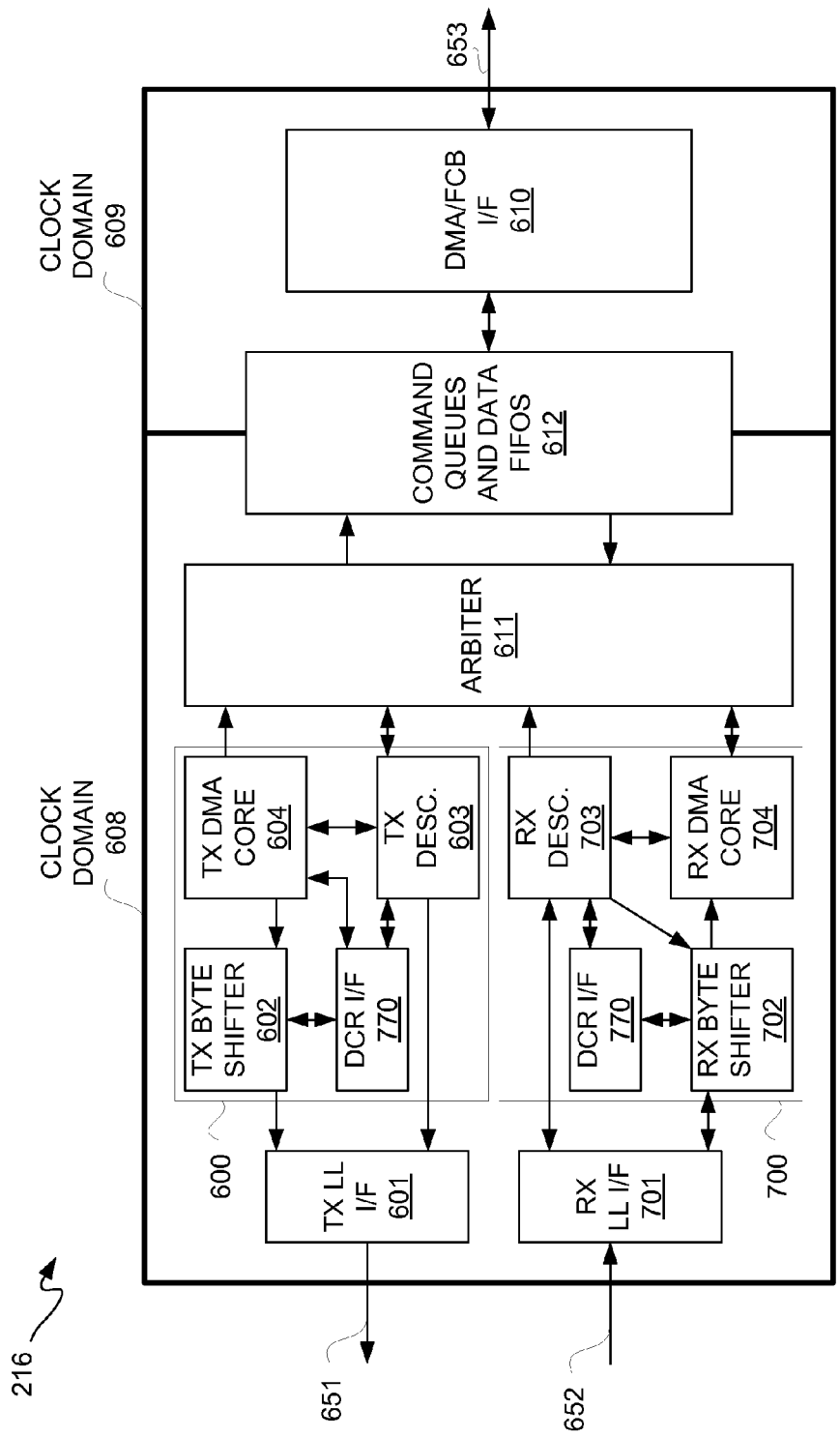
FIG. 3 is a block diagram depicting an exemplary embodiment of a direct memory access ("DMA") engine.

FIG. 3 is a block diagram depicting an exemplary embodiment of a DMA engine 216, which is described with renewed reference to FIG. 2. DMA engine 216 may include a transmit local link interface 601, a transmit DMA channel 600, a transmit/receive arbiter 611, and a DMA-to-gasket interface (described below), receive local link interface 701, and receive DMA channel 700. DMA engine 216 may further include a DCR interface 770 for communicating with internal registers 270. More particularly, DCR interface 770 may be coupled to or part of each of DMA channels 600 and 700 as illustratively depicted as two blocks.

Output arrow 651 indicates direction of data flow to a receive local link device. Input arrow 652 indicates data direction of data flow from a transmit local link device. Bidirectional arrow 653 indicates data direction to and from crossbar 299 via a fabric-to-crossbar ("FOB") interface portion of SPLB interface 214, described below in additional detail. DMA/FCB interface 610, which together with command queues and data FIFOs 612 forms the DMA-to-gasket interface, may be configured to perform a pseudo-local link-to-PLB conversion, and vice-versa for communicating data as between DMA engine 216 and crossbar 299. Arrows within DMA 216 of FIG. 3 generally indicate direction of transactions, as well as direction of data flow. Thus, if a transaction is initiated for example for a read, the direction of initiation of such a read would be opposite to the direction of data flow returned in response to execution of such a read.

For purposes of clarity by way of example and not limitation, it shall be assumed that the application for use of DMA engine 216 is to communicate data to and from memory, such as system memory. Each DMA channel 600 and 700 is controlled by separate descriptors that may be set up by a host CPU, such as microprocessor 200, prior to commencing DMA operations. Among other things, DMA descriptors control how much data is to be transferred and the location of the data in memory. Descriptors may be chained together creating a sequence of commands to control a DMA channel. Such a sequence of chained descriptors may be referred to as a "link list."

A DCR current descriptor pointer register of registers 270 may be written to with a pointer. For purposes of clarity by way of example and not limitation, it shall be assumed that pointer is an 8-word aligned pointer.

A DCR tail descriptor pointer register, which may be part of internal registers 270, may be written to. The write to the DCR tail descriptor pointer register may trigger a fetch of a new descriptor from the location pointed to by the value written to the DCR current descriptor pointer register.

Contents of the 8-word descriptor obtained from the memory location pointed to by the DCR current descriptor pointer register may be loaded into DCR registers for execution by descriptor block 703 of receive DMA channel 700. Likewise, a current descriptor pointer may be written to registers which are coupled to transmit DMA core 604 and transmit descriptor block 603 of transmit DMA channel 600.

When a current descriptor pointer register of registers 270 is written with a current descriptor pointer, a descriptor entry is fetched and placed into a transmit read descriptor FIFO 807. When a current descriptor command is completed, a next descriptor in a link list or chain may be fetched. If the chain or link list of descriptors is completed, the DMA channel may go back to an idle state.

FIG. 6 is a table diagram depicting an exemplary embodiment of a DMA descriptor format 870. Descriptor format 870 may include a plurality of words identified using word number fields 871 ("words 871") and associated byte offset addresses in byte offset address fields 872, as well as descriptors in associated descriptor fields 873. For an example of an 8-word descriptor, words 871 are indicated as being words 0 through 7. Each of such words 0 through 7 may have an associated byte offset address. Word 0 may be for a next descriptor pointer. A next descriptor pointer field indicates where in memory a next descriptor is to be fetched from. The next descriptor pointer field in this example would be an 8-word aligned field. In this example, word 1 may be associated with a buffer address field. The buffer address field is a byte-aligned address pointing to the source or destination of a payload. Word 2 may be associated with a buffer length field. A buffer length field may indicate the length of a payload to be transferred measured in bytes. Word 3 may be associated with a status and control ("status/control") field, as well as a field for application-defined data. The status/control field may be a single byte that contains status and control information for a DMA channel. A bit in the status/control field may be set in a descriptor to indicate it is the last descriptor in a link list. In addition to word 3, words 4 through 7 may be associated with respective application-defined data fields. An application-defined data field may be used for communicating data, as described below in additional detail, which data may be broadcast over a local link interface.

Application-defined data may be used as a communication conduit between microprocessor 200 or other CPU and a local link device coupled to DMA engine 216 but external to processor block 110. For example, such an external local link device may, via receive DMA channel 700, write application-defined data in a descriptor into a memory buffer, and such memory buffer may be accessed by microprocessor 200. The descriptor may be located in a footer in a packet. DMA engine 216 may be configured to strip out the descriptor from the footer of the packet. An example use of such application-defined data may be to include in such a descriptor how long the entire packet is. Because this information is contained in application-defined data, microprocessor 200 upon retrieving such application-defined data need not perform a calculation to determine the entire length of the packet. Similarly, transmit DMA channel 600 may be used by an external local link device coupled to DMA engine 216 to read application data from a memory buffer, where for example microprocessor 200 has written application data to such memory buffer for such external local link device.

For transmit DMA channel 600, application data may be transmitted down a local link interface, such as transmit local link interface 601, during a first descriptor that sets the start of packet ("SOP") bit for such local link interface. For receive DMA channel 700, application data may be received from a local link interface and written back to a last DMA descriptor that was in progress when the local link interface encountered an end of packet ("EOP"). Examples of status and control field information may include DMA error status, interrupt control indicating when a current descriptor has completed, halting, and status, such as when payload is transferred, start of packet status and control, end of packet status and control, and channel busy status. Descriptors may be used to describe a packet. A single descriptor may be used to describe a packet in its entirety. Alternatively, multiple descriptors may be chained together to describe a single packet.

For a single descriptor describing a packet in its entirety, SOP and EOP flags may both be set in the same descriptor. For a transmit operation, these SOP and EOP flags are set by the master that configures the descriptors, such as by microprocessor 200. For a receive operation, these SOP and EOP flags are set by DMA engine 216 when an associated local link interface receives them. For multiple descriptors describing a packet, such multiple descriptors, which may be non-contiguous as described below in additional detail, are chained together to form an apparently contiguous state of payload across a local link interface.

When a DMA descriptor completes, DMA engine 216 writes the descriptor back to memory with a corresponding updated status. Using by way of example a default payload read and write command size for crossbar 299 as being 8-by-128 bits, namely 8 beats of 128 bits each, it should be appreciated that commands are address-aligned to 8-by-128-bit blocks. Because payload is byte-address-aligned, residual commands at the start or end, or both, of such a payload may be issued in order to get the bulk of such payload byte address aligned. Accordingly, the breaking up of 8-by-128-bit commands into multiple smaller commands may be performed for providing data to external memory, namely external with respect to processor block 110. Even though the example of an 8-by-128-bit default payload size is used, it should be appreciated that other payload sizes may be used. Thus, commands may be broken up into "mini-commands".

It should be appreciated that output arrow 651 is for providing to a receive interface of an external local link device. Such a local link interface may be as specified by Xilinx Inc., as is known. It should be appreciated however, that a ready signal may be provided to transmit local link interface 601 from such an external local link device. However, generally transmit local link interface 601 is a unidirectional interface which is used for sending out data via a local interface for consumption by an external local link device. Full-duplex operation is achieved by providing a separate receive and transmit channel, where the transmit and receive local link pair may operate simultaneously. Thus, input arrow 652 is input from a transmit interface of an external local link device. Similarly, it should be appreciated that receive local link interface 701 may provide a destination ready signal to such an external local link device transmit interface.

Transmit DMA channel 600 includes transmit byte shifter 602, transmit DMA core 604, and transmit descriptor block 603. Receive DMA channel includes receive byte shifter 702, receive DMA core 704, and receive descriptor block 703. A DMA/gasket interface includes command queues and data FIFOs 612 and a DMA-Fabric-Crossbar ("DMA/FCB") interface 610.

When data is provided to transmit local link interface 601 from transmit byte shifter 602 or transmit descriptor block 603, such data is provided as it becomes available. A header for a packet to be transmitted uses data derived from transmit read descriptor FIFO 807 of FIG. 4.

Figure 4:
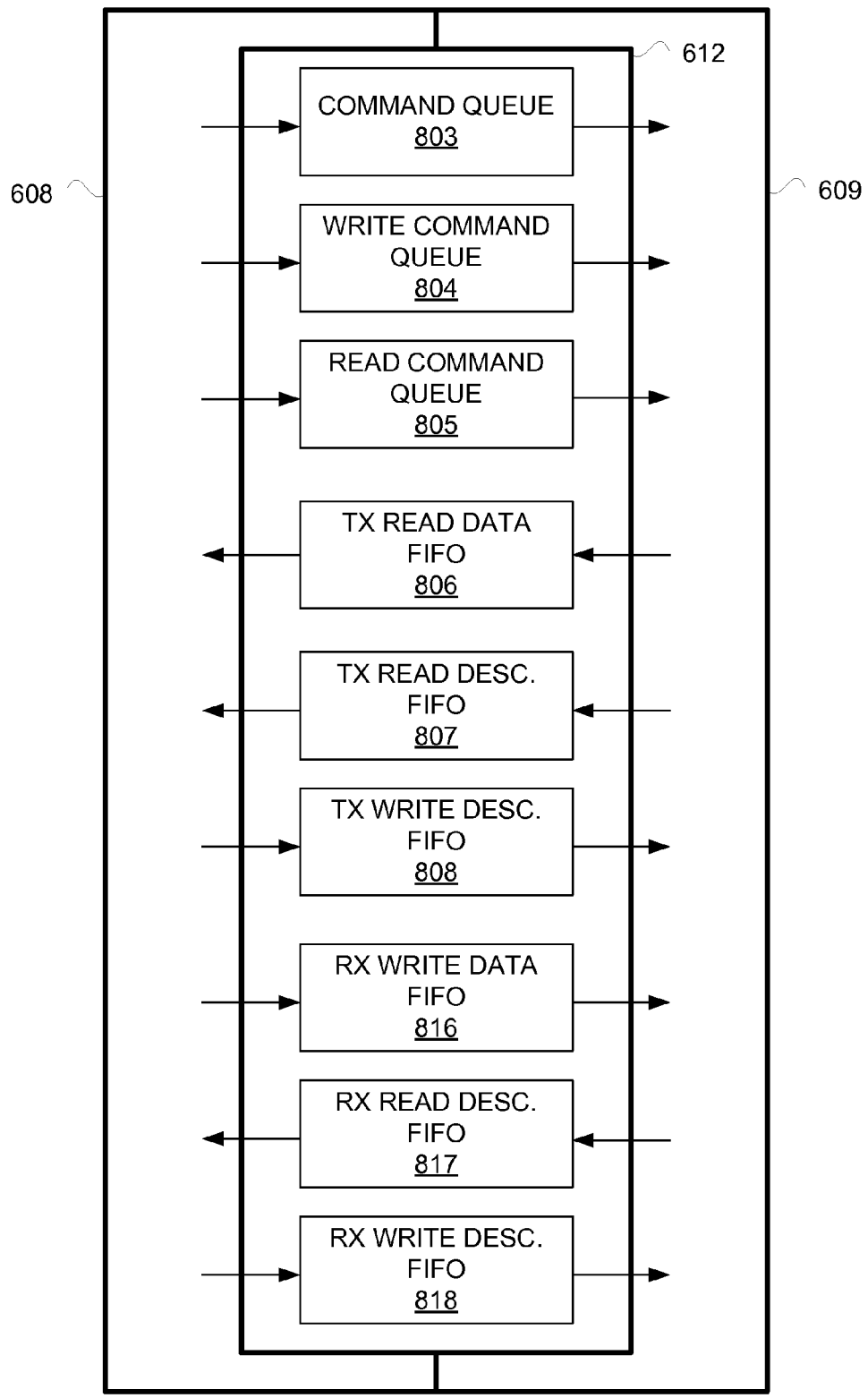
FIG. 4 is a block diagram depicting an exemplary embodiment of command queues and data first-in, first-out buffers ("FIFOs") of the DMA engine of FIG. 3.

Referring to FIG. 4, there is shown a block diagram depicting an exemplary embodiment of command queues and data FIFOs 612.

With simultaneous reference to FIGS. 2 through 4, DMA engine 216 is further described. Command queues and data FIFOs 612 include command queue 803, write command queue 804, read command queue 805, transmit read data FIFO 806, transmit read descriptor FIFO 807, transmit write descriptor FIFO 808, receive write data FIFO 816, receive read descriptor FIFO 817, and receive write descriptor FIFO 818. The input side of queues 803 through 805 and FIFOs 808, 816, and 818 is clocked in the clock domain 608. Clock domain 608 is a local link clock domain. The output side of FIFOs 806, 807, and 817 is clocked in clock domain 608. In contrast, the output side of queues 803 through 805 and of FIFOs 808, 816, and 818 are clocked in clock domain 609. Clock domain 609 is a gasket clock domain associated with a clock rate of crossbar 299. Likewise, the input side of FIFOs 806, 807, and 816 is clocked in clock domain 609. Thus it should be appreciated that rate adaptation as between clock domains 608 and 609, where clock domain 608 may be substantially slower in frequency than clock 609, is provided by command queues and data FIFOs 612. Alternatively, clock domain 608 may be faster than clock domain 609.

When payload is being transmitted, data is derived from transmit byte shifter 602. Thus whenever data is available to send, transmit local link interface 601 may potentially assert a source ready signal. Signals are not illustratively shown for purposes of clarity. Transmit DMA core 604 handshakes with transmit descriptor block 603, issues read payload commands to arbiter 611 until for example a buffer length reaches zero, enqueues copies of these commands into a FIFO residing in transmit byte shifter 602, and updates current buffer address and current buffer length in internal registers 270. Transmit DMA core 604 is initiated by transmit descriptor block 603 asserting a start signal to indicate that a valid descriptor has been fetched and an associated DMA transfer should commence. A DMA transfer may continue until the buffer length of the current descriptor has been decremented down to zero indicating that all bytes associated with the current descriptor have been transmitted. At that time, transmit DMA core 604 may assert a done signal back to transmit descriptor block 603. Transmit descriptor block 603 in response may manage the descriptors, and may issue another DMA transfer start signal to transmit DMA core 604. In other words, the issuance of start and done signals may continue until an entire descriptor chain has been completed.

Transmit DMA core 604 may issue a payload read request signal to arbiter 611. Continuing the above example, such read payload commands may be issued to arbiter 611 in units of 128-bit groups. Thus, a 1-by-128 bits, a 2-by-128 bits, a 3-by-128 bits, . . . , or a 8-by-128 bits read command may be issued. Thus even if only one byte is to be transferred, a 1-by-128 bit read command may be issued for transferring the one byte, and the useful byte of data may be extracted when the data is returned, namely extracted from 128 bits where some of the bits are pad bits. To minimize memory access latency transfers may be aligned with respect to for example MPLB interface 213 by having transmit DMA core 604 align itself to a 1K bit address boundary initially and then starting issuing read burst commands for example of 8 by 128 bits, to crossbar 299. Again, to make an initial alignment, transmit DMA core 604 may issue a single command at the start of a payload or at the start of a new descriptor, if the starting address is not already aligned. Likewise, at the end of a payload or at the end of an intermediate descriptor within a chain of descriptors, where the payload or intermediate descriptor does not finish on a 1K bit boundary, a residual command may be issued at the end of such payload or descriptor.

For a read command to be sent to arbiter 611, there must be sufficient space in transmit read data FIFO 806 available for accepting read data as part of execution of such command. Transmit DMA core 604 may be configured to keep a count of exactly how much space is available in transmit read data FIFO 806 at all times. Thus, for example, when a new command is acknowledged, a counter in transmit DMA core 604 may be decremented by the size of the command. Each time a piece of data is read out of transmit read data FIFO 806, such counter may be incremented.

Read commands may be pipelined to arbiter 611 and all the way to a target interface such as MPLB interface 213 or memory controller interface 212. A done indication may be asserted by transmit DMA core 604 to transmit descriptor block 603 when a last piece of data has actually been sent out on a local link interface associated with output arrow 651. Thus, a descriptor status update may occur after a done signal is asserted and received for purposes of maintaining coherency. Along those lines, a pending payload counter of transmit local link interface 601 may be used to keep track of when a transfer is actually completed on a transmit local link side. Whenever a new command from transmit DMA core 604 is acknowledged by arbiter 611, transmit DMA core may update the current buffer address and current buffer length in internal registers 270 via DCR interface 770 as these registered values may be used for generating a next command. Furthermore, transmit DMA core 604 may create and then queue commands into a FIFO located in transmit byte shifter 602. When data associated with a currently executing descriptor starts coming back at some time after a read payload command was issued, transmit byte shifter 602 needs to know some details about the descriptor associated with that data. Transmit DMA core 604 enqueues an entry into a FIFO corresponding to the descriptor in its currently executing state. Examples of fields within the enqueued entries include an end-of-packet flag, a start-of-packet flag, the size of the payload (such as in bytes) associated with the descriptor, and where in a first quadword received the first valid byte is located.

Transmit descriptor block 603 may be implemented as a state machine controller to handle descriptor table fetching and descriptor management overhead. Transmit descriptor block 603 may be activated by microprocessor 200 writing to a DCR register. Upon activation, transmit descriptor block 603 may issue a descriptor read request to arbiter 611. After acknowledging such a command by arbiter 611, transmit descriptor block 603 may wait for read data to be returned via transmit read descriptor FIFO 806.

Descriptor information return responsive to a read command may include in a first 128-bit quadword a next descriptor pointer, a buffer address, a buffer length, and descriptor status information. The second quadword in response to such read command may be application data that is used to communicate between microprocessor 200 and an external local link device. Alternatively with respect to microprocessor 200, a microprocessor external to processor block 110 may be used. Responsive to a read command from transmit descriptor 603 to arbiter 611, where the descriptor read request is for a first descriptor of a new packet such as indicated by an SOP status flag, both the first and second quadwords may be written out over a transmit local link interface as header information for the new packet.

As previously described, transmit DMA core 604 is activated by assertion of a start signal by transmit descriptor block 603 to instruct transmit descriptor core 604 to perform a DMA transmit operation using descriptor parameters that have been loaded into DCR registers. While this transmit operation is in progress, transmit descriptor block 603 waits for a done signal to be asserted indicating that the DMA operation is complete for the current descriptor. Once a done signal asserted by transmit DMA core 604 is received by transmit descriptor block 603, transmit descriptor block 603 updates the descriptor status to complete in DCR registers. Additionally, transmit descriptor block 603 may update the status for the current descriptor back to memory. With respect to the memory status update, transmit descriptor block 603 writes the status into transmit write descriptor FIFO 808 and then issues a descriptor write request to arbiter 611. After such descriptor write request is acknowledged by arbiter 611, transmit descriptor block 603 checks whether it is to stop executing any more descriptors or whether it is to continue to execute the chain of descriptors. If a status flag indicates a stop-on-end or if a descriptor current pointer equals a descriptor tail pointer, then transmit descriptor block 603 stops executing descriptors. If, however, the status flags do not indicate stop-on-end and if the two pointers, namely the descriptor current pointer and the descriptor tail pointer, are not equal, then the descriptor current pointer is updated with the descriptor next pointer filed and transmit descriptor block 603 continues to execute the chain of descriptors.

To reduce size of write FIFOs and to reduce or avoid the possibility of latency with respect to mini-commands, transmit DMA core 604 may assert an arbitration hold signal for arbiter 611. This arbitration hold signal while asserted allows transmit DMA channel 600 to control all access to command queues and data FIFOs 612. Arbiter 611 may be configured, such as a round robin arbiter, to alternate access between transmit DMA channel 600 and receive DMA channel 700.

Transmit byte shifter 602 may be used to perform flow control between transmit local link interface 601 and transmit read data FIFO 806. Transmit byte shifter 602 may include a command FIFO which enqueues transmit DMA commands and then removes them at appropriate times. Furthermore, transmit byte shifter 602 may be configured to generate EOP and SOP flags for transmit local link interface 601. Additionally, transmit byte shifter 602 may be configured to compute and generate a remainder mask to local link interface 601.

Transmit byte shifter 602 may be configured to process multiple descriptors describing a single packet, which may lead to byte alignment changing dynamically or "on-the-fly" midway through a packet. Transmit byte shifter 602 may be configured to perform dynamic byte alignment of quadword data from transmit read data FIFO 806 to word data for local link consumption. Thus, for example, it should be appreciated that data from transmit read data FIFO 806 or transmit read descriptor FIFO 807, which may be generally referred to as read data, may be provided in 128-bit lines. Moreover, this data as previously described may be provided to DCR registers and to transmit byte shifter 602 for output of 32 bits at a time.

A FIFO command control signal may be provided from transmit DMA core 604 to transmit byte shifter 602 for this byte shifting. Additionally, a descriptor word select control signal may be provided to a multiplexer, such as for selecting from words, such as 32 bit words 0 through 3 of a 128 bit data bus, for output of 32 bits at a time. The output of this multiplexer and the output of transmit byte shifter 602 may be provided to another multiplexer which selects output responsive to a read active control signal. In short, 32 bits at a time may be provided to transmit local link interface 601. It should be appreciated that the above-mentioned multiplexers may be included as part of transmit byte shifter 602.

Commands enqueued in a command FIFO of transmit byte shifter 602 indicate size of the descriptor payload, byte position, and whether the command is associated with an EOP or SOP. Such commands may be enqueued responsive to a transmit DMA shift write enable signal being asserted. Back-to-back writes of 32 bits of data from transmit read data FIFO 806 to transmit local link interface 601 via arbiter 611 and DMA channel 600 may be performed. To avoid introducing "bubbles" or "dead" cycles into the data flow, more than one 32-bit word is maintained in parallel. When a current descriptor ends and it is not an EOP, the next quadword in transmit read data FIFO 806 may be aligned to any byte boundary; in other words, the payload may be realigned dynamically for the new descriptor command. The new descriptor command may be the next command in a chain. At an end of packet or end of descriptor instance, after a last valid byte of data has been consumed, the current quadword may be popped off of transmit read data FIFO 806.

Data input to receive local link interface 701, as generally indicated by arrow 652, is made available to receive byte shifter 702 for receive write descriptor FIFO 818. There may be a direct interface between receive byte shifter 702 and write descriptor FIFO 818, which is not illustratively shown for purposes of clarity and not limitation. When payload is being received, data may be sent to receive byte shifter 702. When a footer of a packet, namely where a packet includes a header, payload, and a footer, is being received, data associated with such footer is sent to receive write descriptor FIFO 818. When space is available in receive write data FIFO 816, a valid descriptor is active and a valid packet has been initiated, data may be received as indicated by assertion of a destination ready signal by receive local link interface 701. Such data ready signal is part of a local link interface and is asserted to an external local link device coupled to receive local link interface 701, which is not shown for purposes of clarity and not limitation.

If multiple descriptors are being used to describe a single packet, a residual number of bytes may remain in receive byte shifter 702 from a previous local link word, which continuing the above example is 32-bit word. Such residual bytes may be concatenated with bytes coming from a next local link word to form a 128-bit crossbar quadword. This process may continue until an EOP signal is sampled by receive local link interface 701 as asserted on a local link interface. When an SOP or EOP signal is asserted on a local link interface by an external local link device coupled to receive local link interface 701, byte shifter 702 may assert register set values for EOP and SOP, respectively, for internal registers 270. In other words, receive byte shifter 702 may update a corresponding status bit for SOP or EOP in DCR registers describing a current descriptor.

Application data updating may be masked. A mode may be used by setting a DCR register bit of internal registers 270 via DCR interface 770 to activate application masking. When active, this application masking mode allows selective update of the first three words of a footer of a second quadword to be selectively updated to memory by using an encoding. This encoding may correspond to register signal values where register bits are active. For this mode, the last word of a footer may be updated to memory, and the written words may be contiguous. Accordingly, footer words may be words 0 through 7 with associated bit values that selectively allow or do not allow masking.

Receive DMA core 704 is initiated by receive descriptor block 703 asserting a start signal. This start signal may further be applied to receive byte shifter 702 and to receive local link interface 701. The start signal indicates that a descriptor has been fetched and that a DMA transfer is to commence. Receive DMA core 704 thus waits for a start signal from receive descriptor block 703 when not in use.

A payload write command FIFO 804 may be enqueued from write byte shifter 702 when a command has been created and associated data is available in receive write data FIFO 816. Receive DMA core 704 may be configured to dequeue FIFO entries and issue corresponding requests to arbiter 611 when receive write data FIFO 816 is not empty. When a last command associated with a descriptor has been acknowledged by arbiter 611 as may be indicated by a descriptor done bit being set, receive DMA core 704 asserts a done signal back to DMA descriptor block 703. Receive descriptor block 703 may manage descriptors, and may issue another DMA transfer start signal to process another descriptor. Descriptors may be processed until an entire descriptor chain has been completely processed.

To hold commands of receive byte shifter 702, a FIFO may be used. Such a FIFO may be included as part of receive byte shifter 702 to avoid having to throttle back local link reception of data due to outstanding write commands not having been acknowledged by arbiter 611. In other words, such receive byte shifter 702 commands may be pre-buffered before being buffered in a FIFO of command queues and data FIFOs 612. Thus, local link data reception may depend on whether there is sufficient space in for example receive write data FIFO 816 and not depend on whether there is sufficient space in command queue 803 or write command queue 804.

Receive descriptor block 703 may be implemented as a state machine controller to handle descriptor table fetching and management of descriptor overhead. Receive descriptor block 703 may be activated by microprocessor 200 writing to a DCR receive tail pointer register of registers 270 with a descriptor table tail address. Upon activation, receive descriptor block 703 issues a descriptor read request to arbiter 611, using a DCR receive current pointer register value stored in internal registers 270 as such an address. A descriptor read request may be acknowledged by arbiter 611. After the descriptor read request is acknowledged by arbiter 611, receive descriptor block 703 may wait for read data to be returned to receive read descriptor FIFO 817.

A first 128-bit quadword received may consist of a next descriptor pointer, a buffer address, buffer length, and descriptor status fields. A second quadword received responsive to such a read command may include application data which is used to communicate between a CPU, such as microprocessor 200 or another CPU, and a local link device coupled to DMA engine 216. The first quadword may be written into DCR registers of internal registers 270. If the first quadword is written to such DCR registers, the second quadword need not be used, and thus may be popped off of receive read descriptor FIFO 817.

In parallel with a register update responsive to a read command, receive DMA core 704 may be activated by the assertion of a start signal. The start signal may be used to activate a local link interface to start receiving data. Such a start signal may be used to inform receive local link interface 701 and receive DMA core 704 to perform a DMA receive operation, using descriptor parameters that have been loaded into DCR registers as previously described. While such a read operation is in progress, a receive descriptor block 703 may wait for a done signal to be asserted by receive DMA core 704. Such a done signal indicates that current DMA operation is complete for a current descriptor. Once a done signal is received by receive descriptor block 703, receive descriptor block 703 updates a descriptor status to complete for the then current descriptor in DCR registers, such as of internal registers 270.

If an EOP bit has not as yet been set for a local link interface, receive descriptor block 703 may update the status for the current descriptor back to memory. For example, receive descriptor block 703 may write the status into receive write descriptor FIFO 818, and then issue a descriptor write request to arbiter 611 for providing such status written in receive write descriptor FIFO 818 to memory via either of interfaces 212 and 213.

If, however, an EOP is set indicating that a packet is complete, footer information received by a local link interface for such packet may be written to memory. In which event, receive descriptor block 703 may wait for the first four footer words, or at least some portion of the footer, to be received before issuing a single write command to arbiter 611 with a partial byte enable pattern. A partial byte enable pattern may be used as only the status byte and application data bytes are updated to avoid overwriting other descriptor control fields that may be reused for other descriptors. Receive DMA core 704 may assert a hold signal to arbiter 611 in this event, to automatically write descriptor words for the above operation to memory.

After a first descriptor quadword write command is successfully acknowledged, a second descriptor write command may be issued, provided data for such command is presently available in receive write descriptor FIFO 818. Such a second quadword for such a second descriptor quadword write command may consist entirely of application data used for communication between an external local link device coupled to DMA engine 216 and external to processor block 110 and a CPU, such as microprocessor 200 or another microprocessor coupled to DMA engine 216 and external to processor block 110. For such a second descriptor quadword write command, byte enables may all be asserted or may be defined by register values associated with masking of an application data update, as previously described.

To accommodate such a sequence of descriptor updates, receive write descriptor FIFO 818 may be configured as a word-writable FIFO. Thus, when a least significant word of a quadword is written to receive write descriptor FIFO 818, it may trigger a write pointer increment. This increment may be provided to a DCR status register such as from receive descriptor core 703. A DCR status register byte in internal registers 270 may be multiplexed into word 3 of a quadword under control of receive descriptor block 703.

After a write command has been acknowledged by arbiter 611, receive descriptor block 703 may check as to whether to stop executing descriptors or to continue to execute the chain of descriptors. If status flags indicate a stop-on-end or if a descriptor current pointer equals a descriptor tail pointer, then receive descriptor block 703 stops executing descriptors. If, however the status flags do not indicate stop-on-end and if the descriptor current pointer does not equal the descriptor tail pointer, the current descriptor pointer is updated with the next descriptor pointer filed and receive descriptor block 703 continues processing descriptors.

Receive byte shifter 702 may be configured to perform flow control between receive local link interface 701 and receive write data FIFO 816. Receive byte shifter 702 may be configured to create payload write commands and enqueue these payload write commands into a command FIFO in receive DMA core 704. Receive byte shifter 702 may be configured to generate EOP, SOP, and decrement buffer count signals to DCR interface 770 for communicating such signals to registers 270. Receive byte shifter 702 may be configured to handle multiple descriptors describing a single packet, namely configured to accommodate dynamic byte alignment. Along those lines, receive byte shifter 702 may perform byte alignment on word data from receive local link interface 701 to quadword data sent to receive write data FIFO 818.

Thus, there are four interfaces for receive byte shifter 702, namely an interface to receive local link interface 701, interface to receive write data FIFO 818, an interface to receive DMA core 704, and an interface to DCR interface 770.

With reference to the receive DMA core interface of receive byte shifter 702, commands may be created and enqueued in sequence by asserting a command write activation signal by receive DMA core 704. Each such command indicates the command type, byte enables, and a starting address, as well as whether the command is associated with an end of descriptors event and whether or not to assert a hold to arbiter 611. Each command may be enqueued if all payload data associated with such command is ready in receive write data FIFO 816. However, the last piece of payload data and the command may be simultaneously driven. Accordingly, receive DMA core 704 may assert a payload write request to arbiter 611 on receipt of the last piece of payload data. Furthermore, receive descriptor block 703 may assert a descriptor write request to arbiter 611, and receive byte shifter 702 may assert a FIFO write command to receive DMA core 704.

A start signal asserted by receive descriptor block 703 may be provided to receive DMA core 704, receive byte shifter 702, and to receive local link interface 701. Receive local link interface 701 may include a payload counter. A current buffer address receive signal may indicate the byte address of a target destination for a command. And a receive current buffer length may indicate the remaining length of the payload to transfer, which may be indicated in bytes.

Because a prior payload is byte-aligned, one or more residual commands may be used at the beginning of handling a next payload in order to bring such a subsequent payload into quadword alignment, if not already aligned. Again, a first residual command may be single 128-bit write with a partial byte enable pattern followed by subsequent 128-bit commands. Alignment of payload is as previously described, and accordingly description of same is not repeated. Furthermore, once payload is exhausted but no EOP is indicated as having been received by receive local link interface 701, then it may be assumed that an intermediate descriptor has completed. Based on this assumption, the end of descriptor field of a current command may be driven. Additionally, a residual command, if needed, may be used to complete the payload transfer or transfers for a current descriptor. In other words, such residual command may be used to provide quadword alignment, as a next descriptor may be aligned to any byte boundary. Accordingly, when a next descriptor is processed, realignment may be invoked as applicable.

With respect to the local link interface of receive byte shift 702, a new 32-bit word from receive local link interface 701 may be used to assert a receive shift data ready output. Assertion of a receive local link shift write activation signal may indicate that a local link has written a word on a data out bus. Accordingly, back-to-back writes from a local link device externally coupled to DMA engine 216 via receive local link interface 701 may be supported.

An EOP signal to DCR registers 270 may be generated at the same time the last quadword is written to receive write data FIFO 818. An SOP signal to DCR registers may be generated at the same time a first local link word is written to receive write data FIFO 818. To generate a correct address and byte enables for a last enqueued command, receive local link shift bits, as previously described with reference to masking of an application data update bus, may be driven to an address for such masking. Concurrently with a receive local link shift, EOP input may indicate how many bytes of a last or current local link word are valid.

With respect to the receive write data FIFO interface of receive byte shifter 702, a receive write data FIFO full signal may be used to indicate whether there is space available in receive write data FIFO 816. Receive write data FIFO 816 may be byte writeable via a receive shift write data FIFO write activation signal. When such a FIFO write activation signal is asserted, a write pointer may be advanced. Individual bytes may be written independently, and when a last byte is written, a write pointer for receive write data FIFO 816 may be advanced.

Accordingly, it should be understood that back to back writes, such as of 32-bit data from a local link interface, may be implemented using receive write data FIFO 816. Data out from receive local link interface 701 may be provided both to receive byte shifter 702 and to a multiplexer of receive descriptor block 703 controlled by a receive descriptor write activation signal. In this manner, more than one 32-bit word may be maintained in parallel to avoid bubbles in data flow. Output of such multiplexer may be provided to receive write descriptor FIFO 818. For an EOP or end of descriptor event, a current quadword being processed may be pushed into receive write data FIFO 818 and corresponding residual commands and byte enables may be generated as previously described.

For arbiter 611, there are generally two groups of requests, namely those coming from transmit DMA channel 600 and those coming from receive DMA channel 700. Within each of these groups of requests there may be three requests and three associated holds. Thus for example, for transmit DMA channel 600 there may be a payload read request, a payload read hold, a descriptor read request, a descriptor read hold, a descriptor write request, and a descriptor write hold, any of which may be provided from transmit DMA channel 600 to arbiter 611. Likewise, for receive DMA channel 700, there may be a payload write request, a payload write hold, a descriptor read request, a descriptor read hold, a descriptor write request, and descriptor write hold, any of which may be provided from DMA channel 700 to arbiter 611. Signals output from arbiter 611 may include a payload read acknowledgment, a descriptor read acknowledgment, and a descriptor write acknowledgment such as may be associated with transmit DMA channel 600. Furthermore, output from arbiter 611 may be a payload write acknowledgment, a descriptor read acknowledgment, and a descriptor write acknowledgment, such as may be associated with receive DMA channel 700. As associated with command queues and data FIFOs 612, and more particularly with command queues thereof, arbiter 611 may assert an enqueue command queue signal. Furthermore, a command queue full signal may be provided from a command queue of command queues and data FIFOs 612 to arbiter 611. Additionally, arbiter 611 may output bits indicating which of channels 600 and 700 is to be granted access to command queues and data FIFOs 612.

The above-described hold signals may be used to inform arbiter 611 to stop advancing to a next master device coupled to DMA engine 216 until a currently acknowledged master device is no longer in a hold mode. This allows a master device to hold arbiter 611 for the duration of multiple commands, or more particularly multiple mini-commands.

For a requesting master device to assert a hold command to arbiter 611, a protocol may be followed. For example, if a hold is to be asserted, then the hold may be simultaneously asserted with a first request of a group of commands, namely a "hold-group". Continued assertion of such a hold for subsequent requests would thus belong to the hold-group. For a last request of such a hold-group, the hold command may be simultaneously de-asserted with the last request. De-assertion of a hold command coincident with a last request may be used to facilitate back-to-back requesting of hold-group commands. In other words, arbiter 611 may be informed when a first group of hold commands ends and when a subsequent group of hold commands starts.

To facilitate data throughput, commands in a hold-group may be issued back to back. A hold signal received by arbiter 611 may be communicated to a crossbar arbiter, such as arbiter 227 of FIG. 2. Crossbar arbiter 227 thus may be held by a DMA channel, such as either of channels 600 and 700, until a command, or more particularly mini-commands, are complete. For example, an entire path from a requesting DMA master device all the way to target memory may be held for the duration of a hold-group, namely until all commands associated with such hold-group have been completed. As previously described, internal registers 270 may be used for storing control register bits to facilitate the above-described hold operation.

Arbiter 611 need not be configured for work-optimized round robin arbitration, but may merely toggle between channel 600 and 700, namely toggle between the two requesting groups of signals giving priority to each group in turn. Within an arbitration group, whether transmit or receive, there may not be a simultaneous assertion of more than one request. For example, if a transmit payload read request is asserted, then neither a transmit descriptor read request nor a transmit descriptor write request may be asserted simultaneously. Because DMA engine 216 is configured to be non-blocking between channel 600 and 700, both channels 600 and 700 may simultaneously request access to arbiter 611.

DMA engine 216 includes local link clock domain 608 and gasket clock domain 609. Accordingly, FIFOs as described with reference to FIG. 4 may be used for bridging a clock domain boundary of clock domain 608 and 609 for read data, write data, and commands. Because gasket clock frequency associated with clock domain 609 may be substantially faster than local link clock frequency associated with clock domain 608, FIFOs as described with reference to FIG. 4 may be synchronizing FIFOs to facilitate operation with synchronization logic. For purposes of clarity by way of example and not limitation, it should be appreciated that local link clock frequency may be in a range of approximately 50 to 250 MHz and gasket clock frequency may be in range of approximately 100 to 400 MHz.

It should be appreciated that local link interfaces are asynchronous interfaces. Accordingly, FIFOs of command queues and data FIFOs 612 may themselves be asynchronous FIFOs to allow a local link clock to be independent of a gasket clock. The local link clock frequency may though need not be an integer multiple of the gasket clock frequency. Furthermore, by having a majority of the circuitry of DMA engine 216 located in clock domain 608, DMA engine 216, or more particularly code for DMA engine 216, may on the whole have more relaxed timing constraints than those associated with DMA/FCB interface 610 for example.

It should be appreciated that transmit FIFOs 806 through 808 may be a separate set of FIFOs from the set of receive FIFOs 816 through 818. By keeping transmit and receive FIFOs separate, non-blocking as between channels 600 and 700 may be facilitated. While transmit read descriptor FIFO 807 may be merged with transmit write descriptor FIFO 808, namely one FIFO may be used for both, separation of such FIFOs provides some simplifications. Likewise, receive read descriptor FIFO 817 may be merged with receive write descriptor FIFO 818.

Queues 803 through 805, which may be implemented as FIFOs, form a command group of queues to allow command pipelined processing. Commands may be enqueued into command queue 803 and then provided to either read command queue 805 or write command queue 804 for enqueuing therein, as those command queues may have available command space. In other instances, as long as there is available space in command queue 803, further commands may be enqueued. For write commands the write data is already available in a corresponding write data FIFO; and for read commands there is enough space to support a command burst size in a corresponding read data FIFO. Enqueuing of commands in command queue 803 may be controlled by arbiter 611.

Commands may be dequeued from command queue 803 under control of arbiter 227. Arbiter 227 may reside in SPLB interface 214 as described in additional detail with below with reference to FIG. 5. If command queue 803 is not empty, then a request via DMA/FCB interface 610 is made to arbiter 227. Read command queue 805 and write command queue 804 may be used to keep track of commands, because by the time data phases start, original commands may already have been removed from command queue 803. For example, data returning from execution of a read command may not be for a current read command in command queue 803 but may be for a prior read command. Accordingly, read command queue 805 may store such prior read command even though command queue 803 may have popped off such read command therefrom. Accordingly, entries in write command queue 804 and read command queues 805 may be used to control data multiplexing into and out of transmit read data FIFO 806 and receive write data FIFO 816.

Transmit FIFOs 806 through 808, namely the transmit channel group of FIFOs, allow payload and descriptor data processing for transmit DMA channel 600. Descriptor read data is enqueued into transmit read descriptor FIFO 807 when returned via DMA/FCB interface 610. Because a read descriptor command is of a fixed format, for example a byte-aligned format or two or more 128-bit groups, a descriptor for such read descriptor command may be entirely processed before a next descriptor is read. This reduces the depth of transmit read descriptor FIFO 807 while allowing DMA engine 216 to be capable of having no bubbles in a data flow. No indication of a full signal need be used for the gasket clock side of transmit read descriptor FIFO 807, because a read descriptor command may only be issued if a previous read descriptor command has already been read out.

Payload read data is enqueued into transmit read data FIFO 806 when returned via DMA/FCB interface 610. The amount of payload data to be returned may be specified, namely the number of requests and the number of dequeued requests may be controlled such that the amount of FIFO space is known. Using this information, use of asynchronous pointers and corresponding flag logic to indicate available space in a FIFO may be avoided. Again, no full indications are need be used on a gasket clock side of transmit read data FIFO 806, as a read payload command may only be issued if there sufficient space in such FIFO.

Descriptor write data is enqueued into transmit write descriptor FIFO 808 when a descriptor has been processed and status is to be updated in memory. Because a transmit write descriptor command is a single 128-bit command with partial byte enables, a next descriptor read command may flush a previous descriptor write command. Thus, transmit write descriptor FIFO 808 entry depth may for example be limited, for example only a one-entry-deep FIFO.

FIFOs 816 through 818, namely the receive channel group of FIFOs, allow payload and descriptor data processing for receive DMA channel 700. Descriptor read data is enqueued into receive read descriptor FIFO 817 when returned via DMA/FCB interface 610. Because a read descriptor command may be of a byte-aligned format of two or more 128-bit groups, a descriptor for such read descriptor command may be entirely processed before a next read descriptor to help limit depth of receive read descriptor FIFO 817. For example, receive read descriptor FIFO 817 may be a two-entry-deep FIFO.

Payload write data is enqueued into receive write data FIFO 816 when available from a receive local link interface 701. A full flag may be used on the local link side of receive write data FIFO 816 to avoid overwriting previously loaded payload data. However, no indication of an empty status on a gasket clock side of receive write data FIFO 816 need be used, because a write payload command may only be issued after the data has been already been enqueued into receive write data FIFO 816.

Descriptor write data may be enqueued into receive write descriptor FIFO 818, when an associated descriptor has been processed and status for such descriptor is to be updated in memory. Because a receive write descriptor command may either be a single 128-bit command with partial byte enables or two single 128-bit commands, a next descriptor read command flushes a previously loaded descriptor write command. Accordingly, receive write descriptor FIFO 818 may have a limited depth, for example may only be two entries deep.

Figure 5:
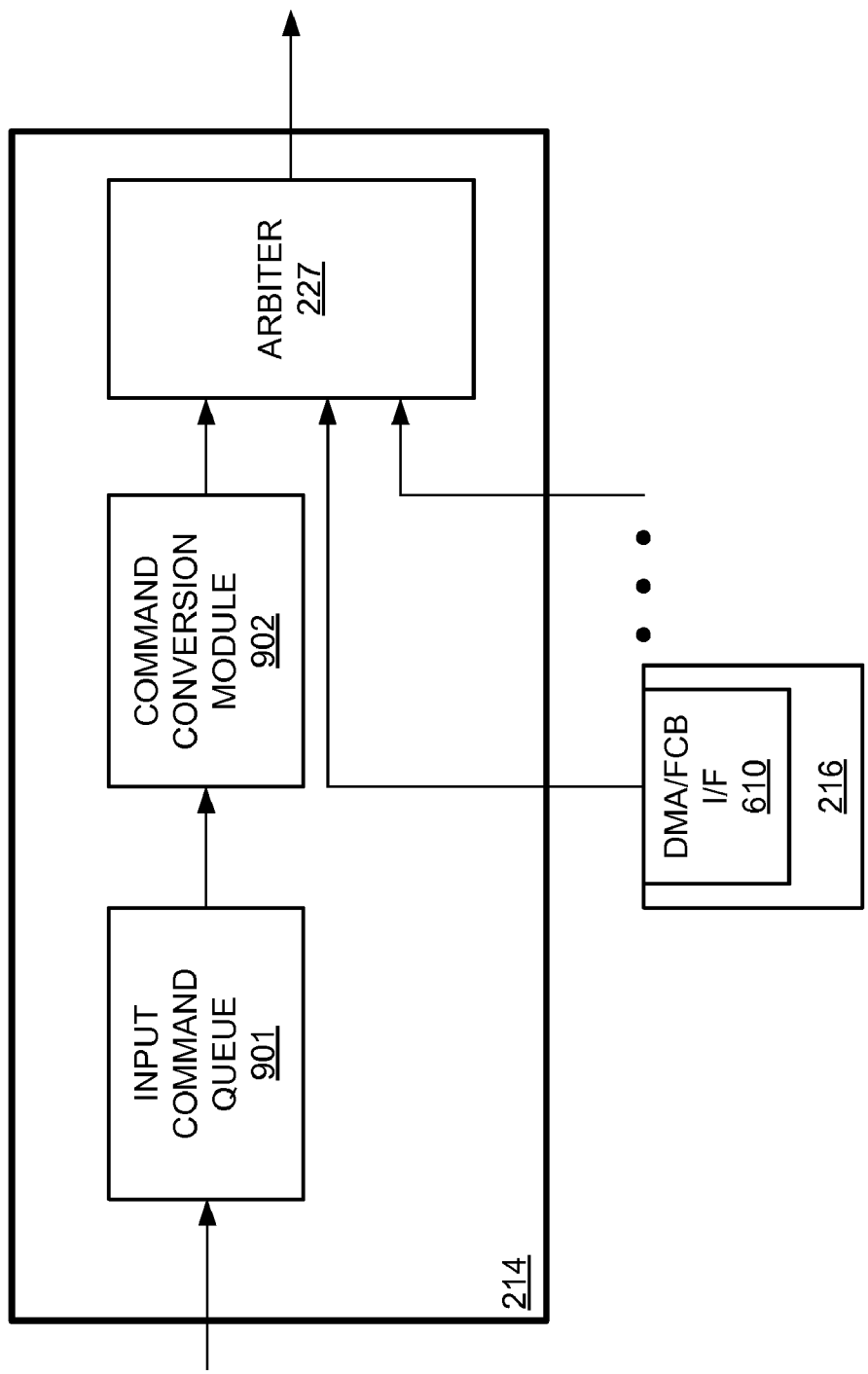
FIG. 5 is a block diagram depicting an exemplary embodiment of the interface between the DMA engine of FIG. 3 and a slave processor local bus interface.

FIG. 5 is a block diagram depicting an exemplary embodiment of the interface between DMA engine 216 and SPLB interface 214. Such interface is further described with simultaneous reference to FIGS. 2 through 5.

Arbiter 227 arbitrates between PLB master devices which may be coupled to DMA engines 216 and 217, as well as SPLB interface 214. Commands, such as from a PLB master device, are input to an input command queue 901 of SPLB interface 214. From input command queue 901, such commands may be provided to a command conversion module 902 for conversions, as appropriate, for providing such commands or converted commands to arbiter 227. DMA/FCB interface 610 of DMA engine 216 may be coupled to arbiter 227. It should be appreciated that FCB/DMA interface 610 may be a dedicated interface. Furthermore, it should be appreciated that other DMA engines, such as DMA engine 217 for example, may have an associated FCB/DMA interface which is separately coupled to arbiter 227. Again, because asynchronous FIFOs, as previously described, are used inside DMA engine 216, FCB/DMA interface 610 may be run at the clock frequency of gasket clock domain 609.

For a write command from DMA engine 216, a sequence of events for a write command request to arbiter 227 may be used. DMA engine 216 may assert a DMA command request when a new write command is ready to send to arbiter 227. Validity information may be provided with: a read not write signal, byte enable signaling, indication of whether either interface 212 or 213 is the target, type of request (read or write), whether a command arbitration hold is asserted, and a target address for the request. This validity information may be provided using a plurality of buses. By buses, it should be understood that it is meant to include either a group of signals, or a group of traces, or both.

It should be appreciated that bursting may be used, for example a range of possible burst commands may be from 1-by-128 bit to 8-by-128 bit bursts. With respect to the latter example, burst length would be 8 beats long or 8 clock cycles for piping 8 increments of 128-bits each.

Arbiter 227 asserts a command acknowledge signal for a cycle when ready to acknowledge that a command has been accepted for processing. Accordingly, arbiter 227 may obtain contents of validity information during such cycle. When arbiter 227 is ready to receive payload data from DMA engine 216, arbiter 227 may assert a write FIFO pop signal. Such a signal may be used for popping one entry out of receive write data FIFO 816 of DMA engine 216 on each clock cycle of a gasket clock of clock domain 609 that such a write FIFO pop signal is sampled. Because as previously described data in receive write data FIFO 816 is ready and available when a write request is provided to arbiter 227, a check for an empty flag by arbiter 227 may be avoided.

For a DMA read command, a sequence of events may be used. For example, DMA engine 216 may assert a command request when a read command is ready to send to arbiter 227. Simultaneously with the read command being ready to be sent, validity information, such as previously described, for the read command may be ready on buses. Again, bursting as previously described may be used for execution of the read command.

Arbiter 227 may assert a command acknowledge, as previously described for a write command, for a read command. Again, arbiter 227 may obtain the validity information with the assertion of the command acknowledgment for the read command.

When crossbar 211 returns DMA read data to DMA engine 216 via DMA/FCB interface 610, arbiter 227 may assert a read FIFO push signal for pushing one transmit read data FIFO 806 entry into DMA engine 216. Accordingly, a read data entry may be pushed on each clock cycle of gasket clock domain 609 into transmit read data FIFO 806 of DMA engine 216 as long as the read FIFO push signal being sampled is asserted. Again, there may not be any need for arbiter 227 to check for a full flag of such transmit read data FIFO 806 of DMA engine 216, because the correct amount of FIFO space available in such transmit read data FIFO 806 is guaranteed to be available before assertion of a read command associated therewith.

Accordingly, it should be appreciated that a DMA engine has been described. It should be appreciated that after a user provides descriptors for example in tables which are written to memory, all execution of such descriptors may be performed in hardware using DMA engine 216.

By having separate transmit and receive DMA channels, separate fetches for receive and transmit descriptors may be made. Thus, it should be appreciated that there are two separate requests which may be made independently with respect to transmit and receive channels. Again, a read request or a write request from a transmit channel may be made, and either of such requests would be independent of a read request or a write request made via a receive channel. More particularly, with respect to transmit channel 600, there are two types of read requests and one type of write request. With respect to payload data, transmit channel 600 has only a read request. In other words, with respect to payload data in a transmit channel only reading is done. However, with respect to descriptors both reading and writing may be done for transmit channel 600. Thus, separate read and write requests may be made for descriptors for transmit channel 600. Likewise, for receive DMA channel 700, separate read and write requests may be made for descriptors. However, for receive DMA channel 700 with respect to payload, only a write request is made. Thus, for example, it should be appreciated that because there are separate receive and transmit channels which are independent of one another, payload may be direct memory accessed while in one channel, while fetching descriptors is performed in another channel.

It should be appreciated that for an operation, such as a read operation, there may be multiple descriptors indicating various locations which likely may be non-contiguous within memory, though two or more of such locations may be contiguous. Furthermore, it should be appreciated that for a write operation, there may be multiple descriptors indicating addresses in memory, again which may refer to non-contiguous memory space. Thus, it should be appreciated that DMA engine 216 is a scatter/gather DMA engine because it allows data to be scattered in non-contiguous memory locations and then gathered from those non-contiguous memory locations. It is possible to do line transfers using DMA engine 216, provided that contiguous memory space for such line transfers is available.

It should be appreciated that a user may supply a link list of descriptors, and all processing of such link list of descriptors may be done in hardware in DMA engine 216. Again, payload data is always written via a receive DMA channel 700 and read via a transmit DMA channel 600 with respect to DMA engine 216. Furthermore, descriptors are read and written, where the writing of descriptors is done to update such descriptors as previously described herein, and where reading and writing may be done in receive and transmit DMA channels.

It should be appreciated that continuous operation with no wait states, namely no bubbles, may be performed while operating with full-duplex capability and while DMA engine 216 shares arbitrated access to crossbar 299 as previously described. In other words, even with the arbitrated access to crossbar switch 299, DMA engine 216 may operate with no wait states. Moreover, such operation may be as high as approximately 8 gigabits per second, and may generally be in a range of approximate 1.6 to 8 gigabits per second.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A direct memory access engine, comprising:
    a transmit channel coupled to a transmit interface;
    a receive channel coupled to a receive interface;
    an arbiter coupled to both the transmit channel and the receive channel;
    a set of queues coupled to the arbiter;
    the set of queues including command buffers, transmit buffers, and receive buffers;
    a direct memory access-to-processor bus interface coupled to the set of queues;
    the transmit buffers configured to store first separate read and write requests; and
    the receive buffers configured to store second separate read and write requests which are independent of the first separate read and write requests,
    wherein the transmit channel is configured to perform data management including first residual transfers and first byte alignments for packet payload reads, first descriptor reads, and first descriptor writes performed via the transmit channel.

2. The direct memory access engine according to claim 1, wherein the direct memory access-to-processor bus interface is configured for converting between a processor local bus protocol regulating communication over a bidirectional bus and a local link protocol regulating communication over a plurality of parallel and unidirectional communication buses.

3. The direct memory access engine according to claim 1, wherein:
    the transmit channel, the receive channel, the transmit interface, the receive interface, and the arbiter are in a first clock domain; and
    the first clock domain is associated with a first clock frequency which is substantially slower than a second clock frequency associated with a second clock domain.

4. The direct memory access engine according to claim 3, wherein the set of queues is a set of asynchronous first-in/first out buffers bridging the first clock domain and the second clock domain.

5. The direct memory access engine according to claim 4, wherein:
the receive buffers include a receive write data buffer, a receive read descriptor buffer, and a receive write descriptor buffer;
the transmit buffers include a transmit read data buffer, a transmit read descriptor buffer, and a transmit write descriptor buffer; and
the command buffers include a read/write command queue, a write command queue, and a read command queue, the read/write command queue queuing commands provided to the direct memory access-to-processor bus interface, the write command queue and the read command queue coupled as shadow buffers respectively tracking write and read commands provided to the read/write command queue until completion.

6. The direct memory access engine accordingly to claim 1, wherein:
the transmit channel includes a transmit byte shifter, a transmit direct memory access module, and a transmit descriptor module;
the receive channel including a receive byte shifter, a receive direct memory access module, and a receive descriptor module; and
the receive channel configured for data management including second residual transfers and second byte alignments for packet payload writes, second descriptor reads, and second descriptor writes performed via the receive channel.

7. The direct memory access engine according to claim 6, wherein the packet payload writes and the packet payload reads are capable of being for scatter/gather operations.

8. The direct memory access engine according to claim 7, wherein the direct memory access engine is capable of continuous operation without any wait states for data rates as high as approximately eight gigabits per second for transmission and eight gigabits for reception for sixteen gigabit full-duplex operation and with arbitrated access to a crossbar switch.

9. A system for direct memory access, comprising:
a crossbar switch;
a memory controller interface coupled on one side of the crossbar switch;
a direct memory access engine coupled on another side of the crossbar switch for communication with the memory controller interface via the crossbar switch;
the direct memory access engine including:
a transmit channel coupled to a transmit interface;
a receive channel coupled to a receive interface;
an arbiter coupled to both the transmit channel and the receive channel;
a set of queues coupled to the arbiter;
the set of queues including command buffers, transmit buffers, and receive buffers;
a direct memory access-to-processor bus interface coupled to the set of queues;
the transmit buffers configured to store first separate read and write requests; and
the receive buffers configured to store second separate read and write requests which are independent of the first separate read and write requests,
wherein the transmit channel is configured to perform data management including first residual transfers and first byte alignments for packet payload reads, first descriptor reads, and first descriptor writes performed via the transmit channel.

10. The system according to claim 9, wherein the direct memory access-to-processor bus interface is configured for converting between a processor local bus protocol and a local link protocol.

11. The system according to claim 9, wherein:
the transmit channel, the receive channel, the transmit interface, the receive interface, and the arbiter are in a first clock domain; and
the first clock domain is associated with a first clock frequency which is substantially slower than a second clock frequency associated with a second clock domain.

12. The system according to claim 11, wherein the set of queues is a set of asynchronous first-in/first out buffers bridging the first clock domain and the second clock domain.

13. The system according to claim 12, wherein:
the receive buffers include a receive write data buffer, a receive read descriptor buffer, and a receive write descriptor buffer;
the transmit buffers include a transmit read data buffer, a transmit read descriptor buffer, and a transmit write descriptor buffer; and
the command buffers include a read/write command queue, a write command queue, and a read command queue, the read/write command queue queuing commands provided to the direct memory access-to-processor bus interface, the write command queue and the read command queue coupled as shadow buffers respectively tracking write and read commands provided to the read/write command queue until completion.

14. The system accordingly to claim 9, wherein:
the transmit channel includes a transmit byte shifter, a transmit direct memory access module, and a transmit descriptor module;
the receive channel including a receive byte shifter, a receive direct memory access module, and a receive descriptor module; and
the receive channel configured for data management including second residual transfers and second byte alignments for packet payload writes, second descriptor reads, and second descriptor writes performed via the receive channel.

15. The direct memory access engine according to claim 14, wherein the packet payload writes and the packet payload reads are capable of being for scatter/gather operations.

16. The direct memory access engine according to claim 15, wherein the direct memory access engine is capable of continuous operation without any wait states for data rates as high as approximately eight gigabits per second for transmission and eight gigabits for reception for sixteen gigabit full-duplex operation and with arbitrated access to a crossbar switch.

17. The direct memory access engine according to claim 1, wherein the transmit channel is configured to perform data management including first residual transfers and first byte alignments for packet payload reads, first descriptor reads, and first descriptor writes performed via the transmit channel.

18. The direct memory access engine according to claim 1, wherein the receive channel is configured to perform data management including second residual transfers and second byte alignments for packet payload writes, second descriptor reads, and second descriptor writes performed via the receive channel.

19. The system accordingly to claim 9, wherein the receive channel is configured to perform data management including second residual transfers and second byte alignments for packet payload writes, second descriptor reads, and second descriptor writes performed via the receive channel.

* * * * *